US011713873B2

(12) United States Patent
Avny

(10) Patent No.: US 11,713,873 B2
(45) Date of Patent: Aug. 1, 2023

(54) LIGHTED MIRROR ASSEMBLY

(71) Applicant: PROJECT LIGHT, LLC, Stow, OH (US)

(72) Inventor: Sam Avny, Boca Raton, FL (US)

(73) Assignee: PROJECT LIGHT, LLC, Stow, OH (US)

( * ) Notice: Subject to any disclaimer, the term of this patent is extended or adjusted under 35 U.S.C. 154(b) by 411 days.

(21) Appl. No.: 16/847,126

(22) Filed: Apr. 13, 2020

(65) Prior Publication Data

US 2020/0326459 A1 Oct. 15, 2020

Related U.S. Application Data

(60) Provisional application No. 62/834,063, filed on Apr. 15, 2019.

(51) Int. Cl.
*F21V 33/00* (2006.01)
*G02B 6/12* (2006.01)
*G02B 7/182* (2021.01)
*A47G 1/02* (2006.01)
*A45D 42/10* (2006.01)
*G02B 5/08* (2006.01)

(52) U.S. Cl.
CPC .......... *F21V 33/004* (2013.01); *A45D 42/10* (2013.01); *A47G 1/02* (2013.01); *G02B 6/12* (2013.01); *G02B 7/182* (2013.01); *G02B 5/08* (2013.01); *G02B 2006/12104* (2013.01)

(58) Field of Classification Search
None
See application file for complete search history.

(56) References Cited

U.S. PATENT DOCUMENTS

| D310,584 S | 9/1990 | Cadet |
| D433,573 S | 11/2000 | Rochon |
| D506,876 S | 7/2005 | Mohundro |
| D620,718 S | 8/2010 | Mischel |
| D634,055 S | 3/2011 | Hokazono |
| D636,188 S | 4/2011 | Kim |
| D639,568 S | 6/2011 | Lee |
| D641,098 S | 7/2011 | Wildner |
| D711,874 S | 8/2014 | Cope |
| D715,731 S | 10/2014 | Nook |

(Continued)

OTHER PUBLICATIONS

Mirror and Marble LED Front Lighted Bathroom Vanity Mirror, by Mirrors and Marble, dated Sep. 17, 2013, found online [Dec. 1, 2021], https://www.amazon.com/Mounted-Lighted-Vanity-MAM83232-Commercial/dp/B00F98322G (Year: 2013).

(Continued)

*Primary Examiner* — Jerry Rahll
(74) *Attorney, Agent, or Firm* — Hudak, Shunk & Farine Co. LPA

(57) ABSTRACT

A lighted mirror assembly containing a mirror front surface including a reflective section as well as a transmissive section that is able to transmit light from a light source through the surface of the mirror glass. The light source also projects light from one or more and preferably all side surfaces of the mirror assembly. The light source is mounted in a waterproof manner within a metal channel having a cover that transmits light therethrough, such as an aluminum channel having a silicone cover.

19 Claims, 6 Drawing Sheets

(56) References Cited

U.S. PATENT DOCUMENTS

| | | | |
|---|---|---|---|
| D738,027 S | 9/2015 | Wang | |
| 9,170,353 B2* | 10/2015 | Chang | G02B 5/08 |
| D834,235 S | 11/2018 | Gambrel | |
| D854,195 S | 7/2019 | Lee | |
| 10,477,993 B2* | 11/2019 | Diemel | G02B 6/0068 |
| 10,823,391 B2* | 11/2020 | Thomas | F21V 23/003 |
| D915,084 S | 4/2021 | Choi | |
| D916,470 S | 4/2021 | Liu | |
| D923,343 S | 6/2021 | Wang | |
| D928,023 S | 8/2021 | Haller | |
| 2009/0067075 A1* | 3/2009 | Porter, III | A45D 42/22 |
| | | | 359/838 |
| 2014/0268748 A1* | 9/2014 | Lay | F21V 23/009 |
| | | | 362/362 |
| 2019/0107275 A1* | 4/2019 | Thomas | F21V 33/004 |

OTHER PUBLICATIONS

Square Wall Mounted LED Back Lit Mirror, by Smartrun; dated Aug. 22, 2018, found online [Dec. 1, 2021], https://www.amazon.com/smartrun-Mounted-Bathroom-Dimmable-JAZZ3636/dp/B07GRQ8W42 (Year: 2018).

\* cited by examiner

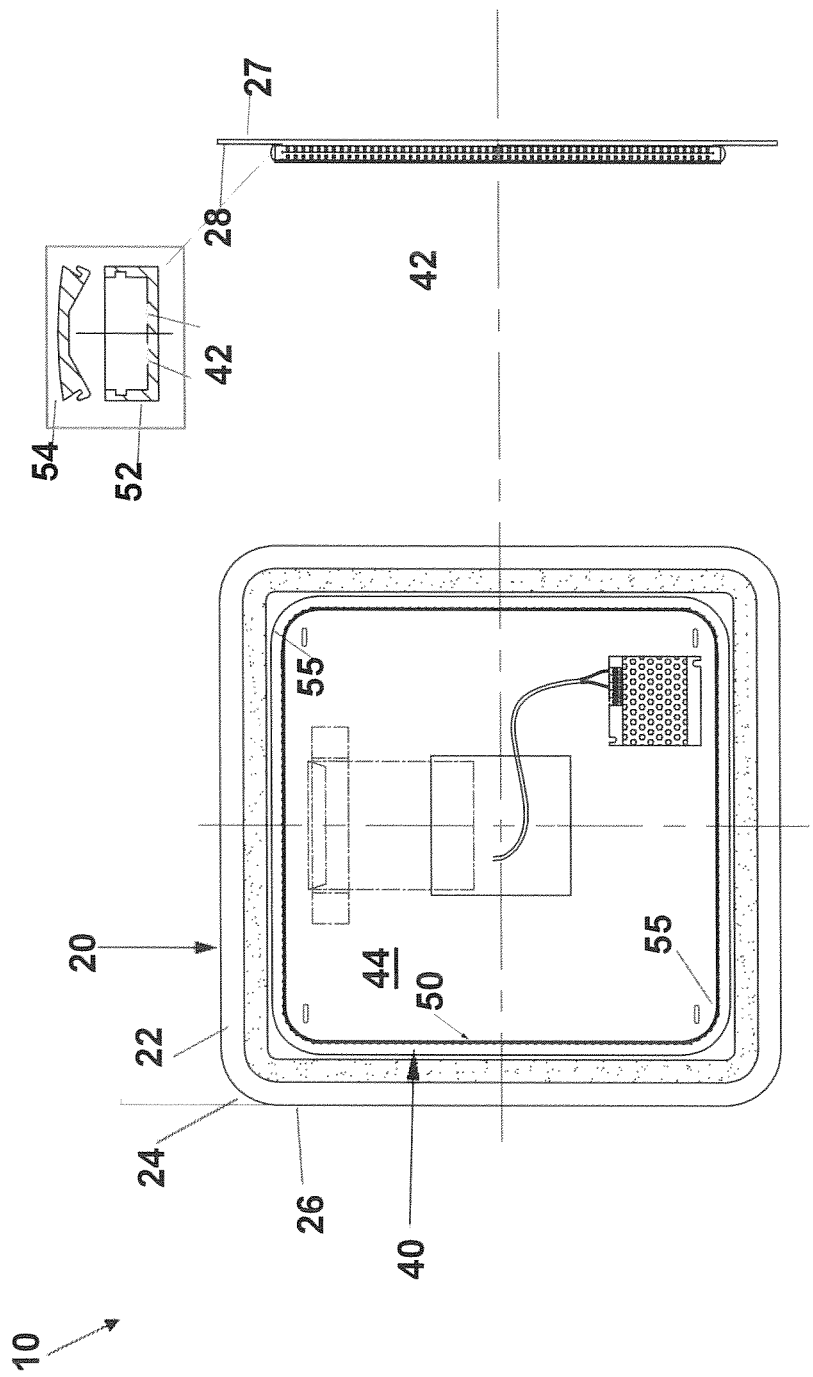

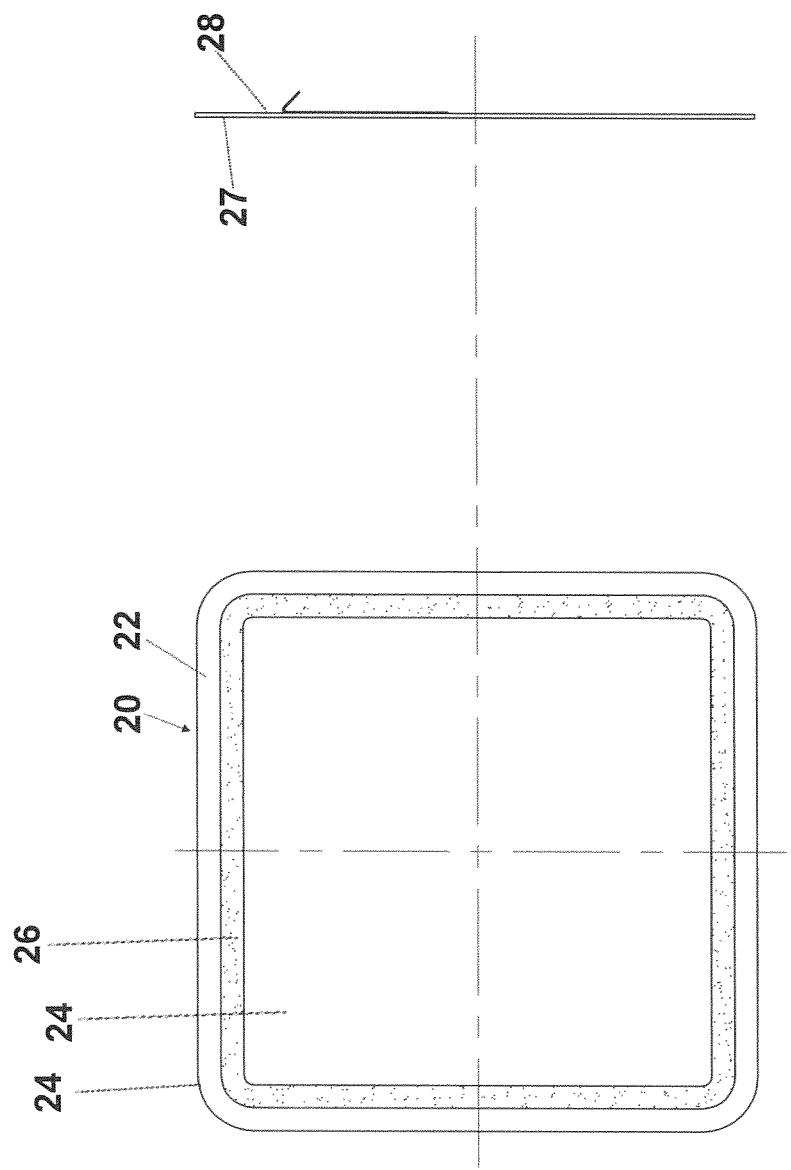

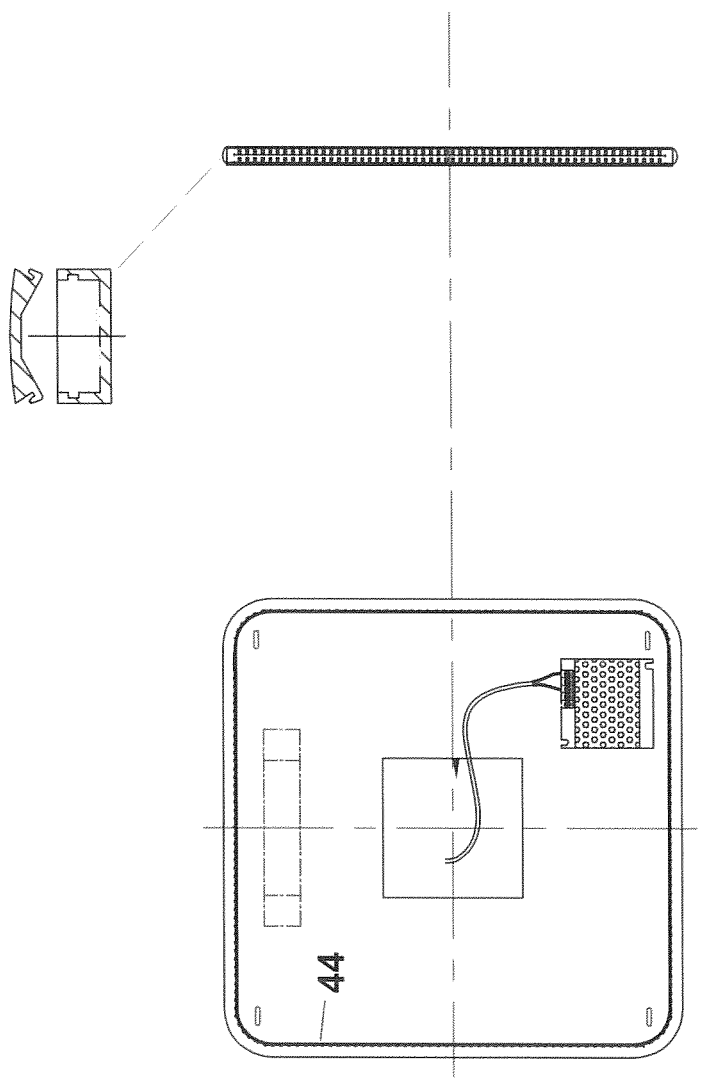

LIGHTED MIRROR ASSEMBLY

CROSS-REFERENCE TO RELATED APPLICATIONS

This application claims priority under 35 USC § 119(e)(1) and § 120 to U.S. Provisional Patent Application Ser. No. 62/834,063 filed Apr. 15, 2019, herein fully incorporated by reference.

FIELD OF THE INVENTION

The present invention relates to a lighted mirror assembly containing a mirror front surface including a reflective section as well as a transmissive section that is able to transmit light from a light source through the surface of the mirror glass. In addition, the light source also projects light from one or more and preferably all side surfaces of the mirror assembly. In an important aspect of the present invention, the light source is mounted in a waterproof manner within a metal channel having a cover that transmits light therethrough, such as an aluminum channel having a silicone cover.

BACKGROUND OF THE INVENTION

Various different types and styles of lighted mirrors are known in the art. However, the art still needs lighted mirrors that provide ample light for a user and are long lasting. In addition, the art still needs a lighted mirror suitable for use in a bathroom or other wet area, which complies with UL and other requirements for wet area electrical fixtures.

SUMMARY OF THE INVENTION

A lighted mirror assembly is disclosed herein including a surface-mounted, solid, waterproof, slim metal channel having a built-in light source, such as an LED light.

Advantageously, the metal channel dissipates heat produced by the light source and also allows angle banding to make any required surface mounted shape configuration without damaging the light source mounted thereto.

In a preferred embodiment, the metal channel comprises aluminum or other lightweight metal that is thermally conductive in order to dissipate heat produced by the light source and thereby prolong the life of the latter.

In one aspect of the invention, the assembly is comprised of two main units, the first being a mirror and the second being a lighting system.

In one aspect, a lighted mirror is disclosed comprising a mirror including a mirror glass having a reflective section and a transmissive section, wherein the reflective section is separated into two segments by the transmissive section, wherein the transmissive section allows light to be transmitted through the mirror glass from a rear side of the mirror glass to a front side of the mirror glass; and a lighting system operatively connected to the rear side of the mirror and having a light source.

In a further aspect, the transmissive section is in the form of a rounded square.

In yet another aspect, the transmissive section includes a continuous light path around an outer surface of the mirror that is bounded on its outer side by a smaller reflective section.

In still a further aspect, the lighted mirror assembly is free of a light source on the front side of the mirror glass.

In a further aspect, the lighting system includes a channel system in the form of a continuous loop located inside of the transmissive section situated on the rear side of the mirror.

In yet another aspect, the channel system has a channel having a base and two sidewalls extending outwardly from the base, wherein a cover is operatively connected between the two sidewalls and seals the light source in the channel system, and wherein light from the light source is transmitted through the cover.

In still a further aspect, the light source is connected to the base of the channel system, wherein the channel base and sidewalls are metal, and wherein the cover comprises a polymer.

In a further aspect, the two sidewalls extend substantially parallel to a main plane of the mirror and the base has a width between the sidewalls that is substantially perpendicular to the plane of the mirror.

In yet another aspect, the channel system loop has four straight sections connected by four curved corner sections.

In still a further aspect, the cover has an upper surface, lower surface and cover sidewalls connecting the upper surface and the lower surface, wherein each cover sidewall has a tongue extending outwardly therefrom that is matable with a groove on an inner surface in the cover sidewalls.

In a further aspect, the transmissive section comprises frosted glass.

In yet another aspect, the mirror comprises a polymer backing on the rear side of the reflective section.

In still a further aspect, the light source comprises light emitting diodes.

It is to be understood that one or more aspects of the invention may be combined in various embodiments of the invention.

BRIEF DESCRIPTION OF THE DRAWINGS

The invention will be better understood and other features and advantages will become apparent by reading the detailed description of the invention, taken together with the drawings, wherein:

FIG. 1 is a front view of one embodiment of the lighted mirror assembly of the present invention wherein a central portion of the mirror glass has been omitted so that the lighting system is visible in the view;

FIG. 2 is side view of the embodiment shown in FIG. 1. A cross sectional view through a channel system is shown in an enlarged view;

FIG. 3 is front view of the mirror glass;

FIG. 4 is a side view of the mirror glass which is shown including a hanger;

FIG. 5 is a rear view of one embodiment of the lighting system showing a back plate;

FIG. 6 is a side view of the embodiment shown in FIG. 5;

FIG. 10 is a photograph of a front perspective view of the lighted mirror assembly, wherein the light source has been turned on.

DETAILED DESCRIPTION OF THE INVENTION

Figure 8:
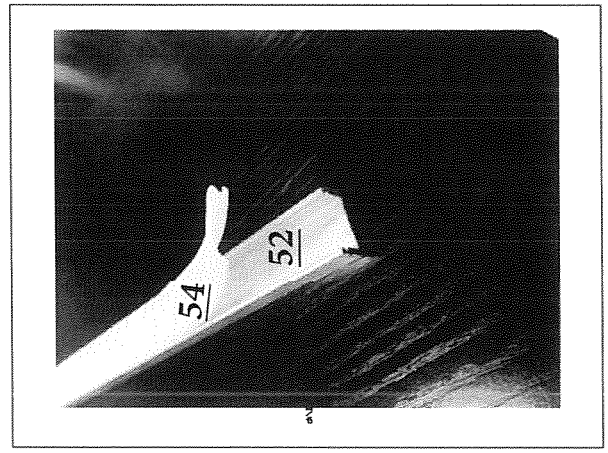
FIG. 8 is a perspective view of the channel system shown in FIG. 7 with a portion of the cover removed in order to show an interior section of the channel.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The present invention relates to a lighted mirror assembly that projects light through a portion of mirror glass of a mirror of the assembly as well as outwardly from one or more sides, and preferably all sides in one embodiment, of the assembly. The assembly includes a channel system designed to dissipate heat produced by a light source and also provide angle banding that allows substantially any desired shape configuration, with the light source being adaptable thereto.

Turning now to the drawings, wherein like reference numbers denote the same or like parts throughout the several views, a lighted mirror assembly 10 is shown in the figures. Lighted mirror assembly 10 includes two primary components, mirror 20 and lighting system 40.

Mirror 20 includes a mirror glass 22 having a reflective section 24 and a transmissive section 26. As illustrated in FIG. 3, the reflective section is separated into two or more segments by a transmissive section 26, which is in the form of a rounded square. The transmissive section 26 includes a continuous light path around the outer surface of the mirror that is bounded on its outer side by a smaller reflective section 24. It is to be understood that the transmissive section 26 can have alternative forms and is not limited to the embodiment shown in FIG. 3. The transmissive section 26 allows at least some of the light projected by light system 40 to be transmitted through mirror glass 22 and be viewed from a front side of the lighted mirror assembly 10.

Mirror glass 22 can have any desired thickness such as 5 mm. Preferably the edges are polished and a backing such as a vinyl backing is applied for safety. The dimensions of the mirror glass 22 can vary as desired. In the embodiment illustrated in FIG. 1, the glass has a maximum length and width of 24 inches. The transmissive section 26 in some embodiments is frosted such that section 26 is not completely transparent. Light is transmitted from a rear side 28 to a front side 27 of a lighted mirror assembly. Transmissive section 26 is preferably a frosted translucent area which is produced to allow a sufficient or desired amount of light to pass through mirror glass 22.

In one embodiment as shown in FIG. 4, the rear side of the mirror glass is provided with a hanger for hanging lighted mirror assembly 10.

Lighting system 40 is operatively connected to mirror 20 on a rear surface or side 28 thereof. In a preferred embodiment the lighting system is sized to fit within an inner perimeter of the transmissive section 26, such as illustrated in FIG. 1. Stated in another manner, the lateral dimensions, length and width, of lighting system 40 are smaller than the lateral length and width of transmissive section 26. This requirement allows light transmitted from light source 42 to be transmitted through transmissive section 26. In addition, the light source is able to project light towards at least one side surface of the lighted mirror assembly 10 and preferably to each of the four sides as illustrated in FIG. 1. Obviously, if other configurations of mirror glass 22 are utilized, light can be projected from four or less or four or more side surfaces of a lighted mirror assembly.

Light source 42 can comprise any suitable device that emits light. However, LED lighting is preferred from the aspect of durability, long life, and energy conservation. In one embodiment the light source comprises two LED light strips which project light over a 120° angle. This allows light to project towards a wall on which the device is hung laterally away from the mirror as well as forward through the transmissive section 26 in order to produce a sufficient amount of light. From an energy conservation standpoint, low wattage is preferably utilized, such as about 40 watts in one embodiment.

Generally, any desired color temperature can be utilized, as desired by the customer. Color temperatures generally range from about 1,000 Kelvin to about 7,000 Kelvin. Color temperature of around 2,700 K is preferred in one embodiment.

The lighted mirror system 40 includes a housing 44 including a base 46 in channel system 50. Channel system 50 includes a channel 52, preferably u-shaped in one embodiment, and a cover 54, that is able to transmit light from the light source that is located within the channel.

In one embodiment, when the light source is a flexible strip, it is connected to an interior section of channel 52. Adhesive strip lighting is preferred in embodiments where the light source is desired to be placed around a corner, for example 55 as shown in the drawings.

Figure 7:
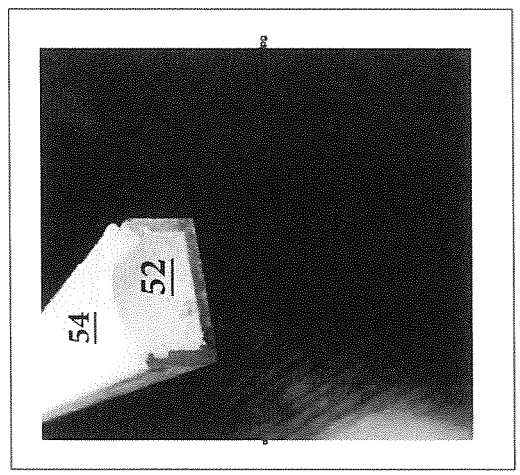
FIG. 7 is a perspective view of one embodiment of a channel system of the present invention.
Figure 9:
FIG. 9 is a photograph of a front perspective view of the lighted mirror assembly with the light source off.
Figure 10:
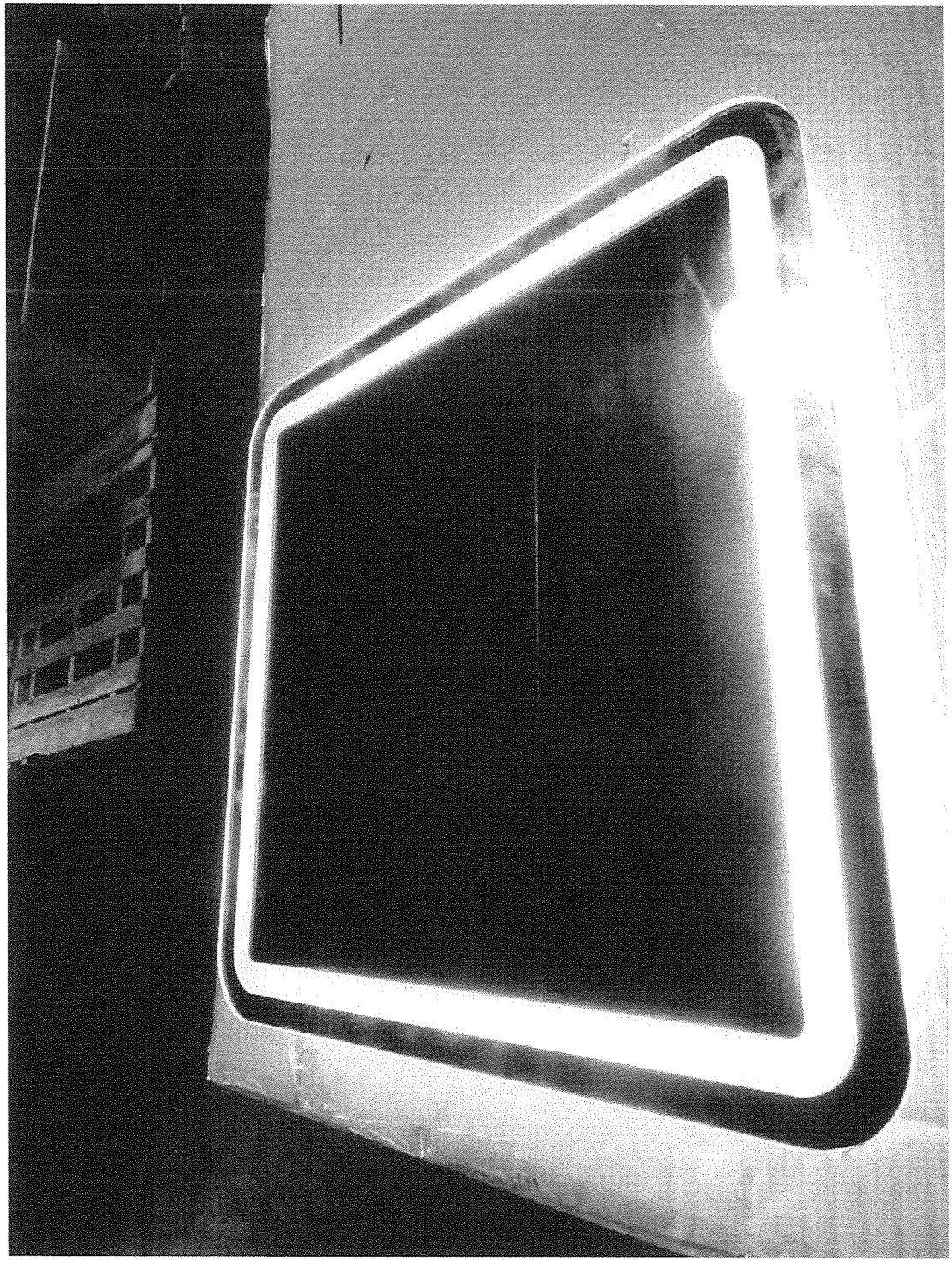

As indicated hereinabove, channel 52 preferably comprises a metal, preferably aluminum in one embodiment, that is able to thermally conduct and thus dissipate heat produced by the light source and also allow a desired channel system configuration to be created. A cover 54 that is able to transmit light from light source 42 is preferably operatively connected to channel 52. As illustrated in FIGS. 2, 7 and 8, the channel includes a recess which accommodates a projection extending from cover 54. Cover 54 can be formed from any suitable material. A silicone cover is preferred in one embodiment as it is flexible and can conform to rounded corners without buckling or cracking, durable, and waterproof.

The light source 42 can be powered in any suitable manner. In one embodiment a light driver having desired voltage, such as 120 volts is utilized.

The lighting system is connected to mirror 20 utilizing a durable adhesive connection in a preferred embodiment.

For the avoidance of doubt, the products and device of the present invention encompass all possible combinations of the components, including various ranges of said components, disclosed herein. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A lighted mirror assembly, comprising:
   a mirror including a mirror glass having a reflective section and a transmissive section, wherein the reflective section is separated into two segments by the transmissive section, wherein the transmissive section allows light to be transmitted through the mirror glass from a rear side of the mirror glass to a front side of the mirror glass; and
   a lighting system operatively connected to the rear side of the mirror and having a light source; and
   wherein the lighting system includes a channel system in the form of a continuous loop located inside of the transmissive section situated on the rear side of the mirror.

2. The lighted mirror assembly according to claim 1, wherein the transmissive section is in the form of a rounded square.

3. The lighted mirror assembly according to claim 2, wherein the transmissive section includes a continuous light path around an outer surface of the mirror that is bounded on its outer side by a smaller reflective section.

4. The lighted mirror assembly according to claim 1, wherein the lighted mirror assembly is free of a light source on the front side of the mirror glass.

5. The lighted mirror assembly according to claim 1, wherein the channel system has a channel having a base and two sidewalls extending outwardly from the base, wherein a cover is operatively connected between the two sidewalls and seals the light source in the channel system, and wherein light from the light source is transmitted through the cover.

6. The lighted mirror assembly according to claim 5, wherein the light source is connected to the base of the channel system, wherein the channel base and sidewalls are metal, and wherein the cover comprises a polymer.

7. The lighted mirror assembly according to claim 6, wherein the two sidewalls extend substantially parallel to a main plane of the mirror and the base has a width between the sidewalls that is substantially perpendicular to the plane of the mirror.

8. The lighted mirror assembly according to claim 7, wherein the channel system loop has four straight sections connected by four curved corner sections.

9. The lighted mirror assembly according to claim 8, wherein the cover has an upper surface, lower surface and cover sidewalls connecting the upper surface and the lower surface, wherein each cover sidewall has a tongue extending outwardly therefrom that is matable with a groove on an inner surface in the cover sidewalls.

10. The lighted mirror assembly according to claim 9, wherein the transmissive section comprises frosted glass.

11. The lighted mirror assembly according to claim 10, wherein the mirror comprises a polymer backing on the rear side of the reflective section.

12. The lighted mirror assembly according to claim 1, wherein the light source comprises light emitting diodes.

13. A lighted mirror assembly, comprising:
    a mirror including a mirror glass having a reflective section and a transmissive section, wherein the reflective section is separated into two segments by the transmissive section, wherein the transmissive section allows light to be transmitted through the mirror glass from a rear side of the mirror glass to a front side of the mirror glass;
    a lighting system operatively connected to the rear side of the mirror and having a light source;
    wherein the transmissive section is in the form of a rounded square;
    wherein the transmissive section includes a continuous light path around an outer surface of the mirror that is bounded on its outer side by a smaller reflective section; and wherein the lighting system includes a channel system in the form of a continuous loop located inside of the transmissive section situated on the rear side of the mirror.

14. The lighted mirror assembly according to claim 13, wherein the light source comprises emitting diodes.

15. The lighted mirror assembly according to claim 14, wherein the channel system has a channel having a base and two sidewalls extending outwardly from the base, wherein a cover is operatively connected between the two sidewalls and seals the light source in the channel system, and wherein light from the light source is transmitted through the cover.

16. The lighted mirror assembly according to claim 15, wherein the light source is connected to the base of the channel system, wherein the channel base and sidewalls are metal, and wherein the cover comprises a polymer.

17. The lighted mirror assembly according to claim 16, wherein the two sidewalls extend substantially parallel to a main plane of the mirror and the base has a width between the sidewalls that is substantially perpendicular to the plane of the mirror.

18. The lighted mirror assembly according to claim 17, wherein the channel system loop has four straight sections connected by four curved corner sections.

19. The lighted mirror assembly according to claim 18, wherein the cover has an upper surface, lower surface and cover sidewalls connecting the upper surface and the lower surface, wherein each cover sidewall has a tongue extending outwardly therefrom that is matable with a groove on an inner surface in the cover sidewalls.

* * * * *